(12) United States Patent
Garfinkel

(10) Patent No.: US 12,338,077 B1
(45) Date of Patent: Jun. 24, 2025

(54) MULTIPURPOSE CONVEYOR SYSTEM

(71) Applicant: Frederick Alex Garfinkel, Johnstown, PA (US)

(72) Inventor: Frederick Alex Garfinkel, Johnstown, PA (US)

( * ) Notice: Subject to any disclaimer, the term of this patent is extended or adjusted under 35 U.S.C. 154(b) by 0 days.

(21) Appl. No.: 18/961,299

(22) Filed: Nov. 26, 2024

(51) Int. Cl.
    *B65G 37/00* (2006.01)
    *B65G 15/58* (2006.01)
    *B65G 41/00* (2006.01)

(52) U.S. Cl.
    CPC ............. *B65G 37/00* (2013.01); *B65G 15/58* (2013.01); *B65G 41/003* (2013.01); *B65G 2203/0291* (2013.01); *B65G 2812/02227* (2013.01)

(58) Field of Classification Search
    CPC .................................................... E21B 21/062
    See application file for complete search history.

(56) References Cited

U.S. PATENT DOCUMENTS

| | | | | |
|---|---|---|---|---|
| 4,232,973 A * | 11/1980 | Ligouzat | ........... | B01F 35/71731 366/291 |
| 5,213,414 A * | 5/1993 | Richard | .............. | B01F 35/7544 366/38 |
| 8,881,749 B1 * | 11/2014 | Smith | ................... | B65G 69/18 15/301 |
| 9,828,184 B1 * | 11/2017 | Bynum | .................. | B65G 21/12 |
| 11,821,298 B1 * | 11/2023 | Fisher | ................... | E21B 21/062 |
| 2009/0120846 A1 * | 5/2009 | Burnett | ................. | E21B 21/065 209/660 |
| 2013/0112598 A1 * | 5/2013 | Culver | ..................... | B03B 7/00 209/10 |
| 2015/0315861 A1 * | 11/2015 | Zachariasen | .......... | E21B 15/003 166/77.2 |
| 2018/0327189 A1 * | 11/2018 | Stegemoeller | ......... | B65G 33/14 |
| 2020/0048985 A1 * | 2/2020 | Oehler | ................... | B65G 27/16 |
| 2021/0024291 A1 * | 1/2021 | Teichrob | ........... | B01F 35/71705 |
| 2022/0333473 A1 * | 10/2022 | Snyder | ................ | E21B 43/2607 |
| 2023/0358125 A1 * | 11/2023 | Willis | ................ | B65G 69/0425 |
| 2024/0271515 A1 * | 8/2024 | Bolt | ................... | E21B 43/2607 |
| 2024/0300059 A1 * | 9/2024 | Bryant | ................... | E21B 43/11 |

* cited by examiner

*Primary Examiner* — David Carroll
(74) *Attorney, Agent, or Firm* — Barry Choobin; Patent 360

(57) ABSTRACT

A conveyor system and a method for transporting proppants and drill cuttings to a blender and dryer respectively in oil and gas fields. The conveyor system includes an upper conveyor belt aligned horizontally and encased within a frame. The conveyor system also includes a lower conveyor belt positioned below the upper conveyor belt. The lower conveyor belt is configured to extend outwards from the frame and angularly lifted. In use, the lower conveyor belt is lifted to the level of the blender or the dryer. Material from the transport containers is dropped on the upper conveyor belt and the material is carried to the lower conveyor belt. The lower conveyor belt carries the material upwards to the blender or the dryer.

11 Claims, 7 Drawing Sheets

MULTIPURPOSE CONVEYOR SYSTEM

FIELD OF INVENTION

The present invention relates to a dual-purpose conveyor system, and more particularly, the present invention relates to a conveyor system and a method for conveying wet or dry proppant and drill cuttings waste.

BACKGROUND

Drilling and Hydraulic fracturing has become a standard in oil and gas production. The fracturing process requires a huge amount of frac sand and drilling produces drill-cutting waste. All this requires an extensive logistic network for transporting sand and waste. Thus, logistics play a key role in determining the profitability of any oil gas field.

Besides the increased cost and pressure on the logistics industry, there are also safety and environmental concerns. Carbon emission is a major factor behind global warming and air pollution. Reducing carbon emissions has become a primary environmental goal for most countries.

In transporting frac sand to oil fields, the transport vehicle returns empty. Similarly, the vehicles transporting waste from drilling sites run the first leg of the trip empty and then loaded with waste. Managing these logistics operations also requires significant manpower that increases cost of operations.

Thus, there is a need for a system and method that help overcome the above drawbacks and limitations in handling and transporting materials in oil and gas fields.

SUMMARY OF THE INVENTION

The following presents a simplified summary of one or more embodiments of the present invention in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a dual-purpose conveyer system for frac sand and drill cutting waste.

Another object of the present invention is that the costs of logistics can be reduced.

Still, another object of the present invention is that the carbon emissions in transportation can be reduced.

Yet the object of the present invention is that material handling and transportation can be made more efficient.

In one aspect, disclosed is a conveyor system comprised of an upper conveyor belt aligned horizontally and encased within a frame; and a lower conveyor belt positioned below the upper conveyor belt, wherein the lower conveyor belt is configured to extend outwards from the frame and angularly lifted, such that material from the upper conveyor belt drops on the lower conveyor belt. The lower conveyor belt is configured to be raised at different heights. The upper conveyor belt and the lower conveyor belt are configured can be driven at different speeds. The horizontal belt has a smooth and flat surface and is configured to transport materials horizontally. The lower conveyor belt is a cleated belt, wherein the lower conveyor belt is configured to transport material steeply at a height. The lower conveyor belt comprises raised section nubs configured to prevent materials from sliding or rolling off the lower conveyor belt during transportation. The frame is multi-unit, each unit comprises a platform on a top of the unit, and the platform is configured to mount a transport container. Each unit comprises four container mounting pins and load cells at four corners of the platform. Each unit further comprises one or more cameras with onboard lighting, one or more rod motors, one or more hopper motors, and one or more air shooters.

In one aspect, disclosed is a method for conveying materials to a blender and a dryer in oil and gas fields, the method comprising mounting one or more transport containers to one or more units of a conveyor system. The conveyor system comprises a frame; an upper conveyor belt aligned horizontally and encased within the frame; and a lower conveyor belt is positioned below the upper conveyor belt, wherein the lower conveyor belt is configured to extend outwards from the frame and angularly lifted, such that material from the upper conveyor belt drops on the lower conveyor belt. The method further comprises extending the lower conveyor belt outwards; and angularly raising the upper conveyor belt to a level of a hopper of the blender or the dryer. The lower conveyor belt is configured to be raised at different heights. The upper conveyor belt and the lower conveyor belt are configured can be driven at different speeds. The horizontal belt has a smooth and flat surface and is configured to transport materials horizontally. The lower conveyor belt is a cleated belt, wherein the lower conveyor belt is configured to transport material steeply at a height. The lower conveyor belt comprises raised section nubs configured to prevent materials from sliding or rolling off the lower conveyor belt during transportation. The frame is multi-unit, each unit comprises a platform on a top of the unit, and the platform is configured to mount a transport container. Each unit comprises four container mounting pins and load cells at four corners of the platform. Each unit comprises one or more cameras with onboard lighting, one or more rod motors, one or more hopper motors, and one or more air shooters.

BRIEF DESCRIPTION OF DRAWINGS

The accompanying figures, which are incorporated herein, form part of the specification and illustrate embodiments of the present invention. Together with the description, the figures further explain the principles of the present invention and to enable a person skilled in the relevant arts to make and use the invention.

DETAILED DESCRIPTION

Figure 1:
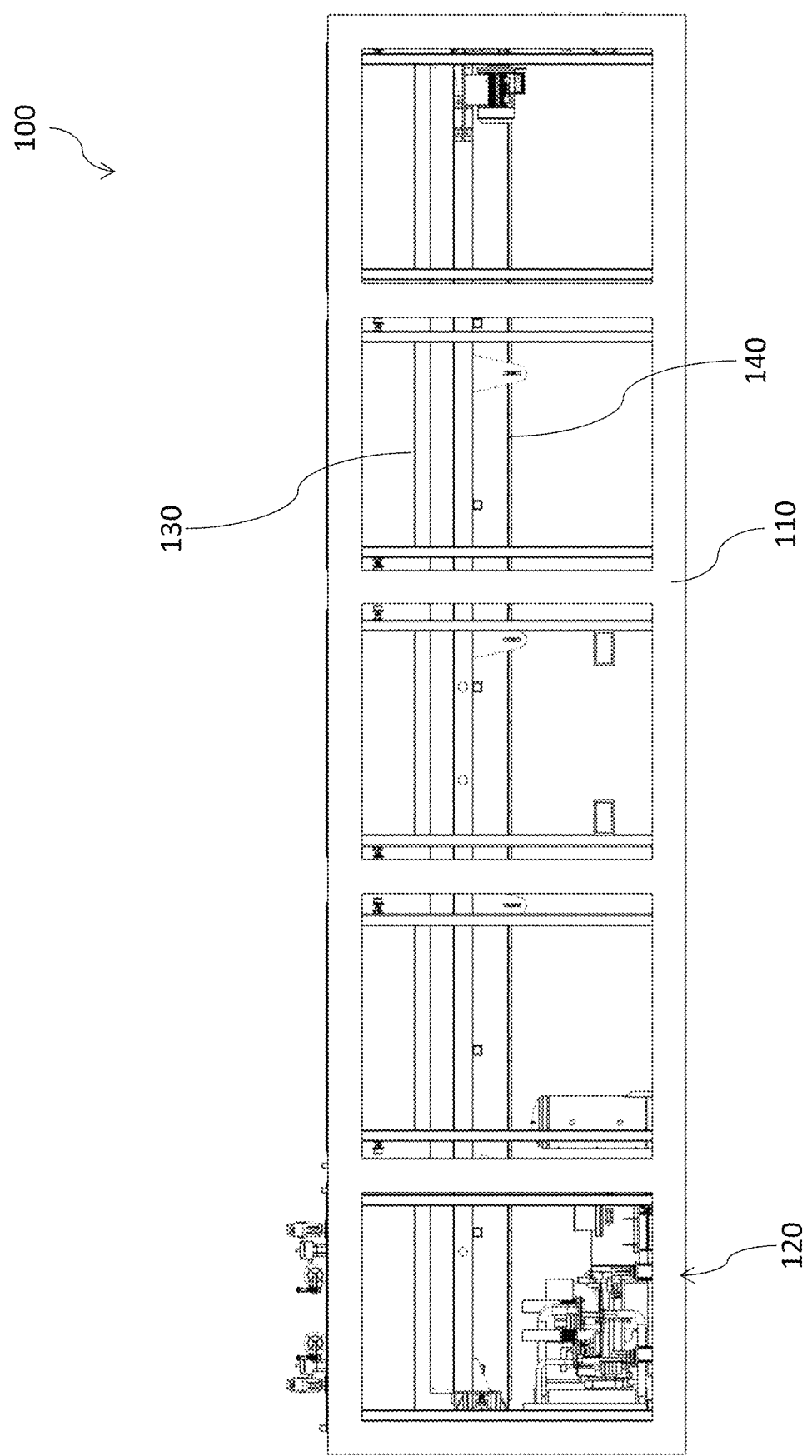
FIG. 1 shows a side view of the conveyor system, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage or mode of operation.

The terminology used herein is to describe particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

Disclosed is a conveying system for use in oil and gas fields for dispensing proppant to a blender and drill cutting waste into a vertical cutting dryer and centrifuge. The disclosed conveyor system can be used for both dry and wet proppants. The disclosed conveying system enables emptying the frac sand from the transport container and dispensing the frac sand into a blender at the site. The conveyors can also be used to recycle drill cuttings at nearby locations. The drill-cutting waste can be carried directly to a hopper of a vertical cutting dryer and centrifuge.

Thus, the dual-use conveyor system can significantly reduce the number of truck trips required per wellhead. The same conveyor system can be used for both frac sand and drill cuttings. It eliminates the need for separate transport logistics for frac sand and drill cuttings, thereby saving time, resources, and carbon emissions. The disclosed dual-use conveyor system can be used with dual-use transport containers. Such a dual-use container is described in U.S. patent Ser. No. 11/174,098 B2. Thus, the disclosed dual-use conveyor system can make the process more efficient and sustainable.

The disclosed system can optimize transportation and waste management at well sites, offering a more environmentally friendly approach to oil and gas operations. It is to be noted that preferred embodiments describe the use of the disclosed conveyor system in oil and gas fields, however, it is to be noted that the conveyor system can be used to transport any suitable material in any field without departing from the scope of the present invention.

Now referring to FIG. 1, which shows a side view of a conveyor system 100 according to an exemplary embodiment of the present invention. The conveyor system includes a frame 110 for structural support and mounting different components of the conveyor system. The frame as shown in FIG. 1 can be illustrated as a multi-unit structure for explanation, wherein the first unit is referred to as the main unit 120. The main unit may encase different components for driving the conveyor system including electronic parts, motors, and hydraulics. The main unit may include the motors for driving the conveyor belts. The frame includes conveyor belts, i.e., an upper conveyor belt 130 and a lower conveyor belt 140 that extends throughout the frame. The upper conveyor belt may remain fixed while the lower conveyor belt can be extended towards the right i.e., opposite side of the main unit. Material from the mounted containers can be received on the upper conveyor belt and further transported by the lower conveyor belt. Transport containers can be positioned on top of the frame for emptying wherein materials through hoppers are collected on the hopper belt. FIG. 1 shows the system having five units for five transport containers.

Figure 2:
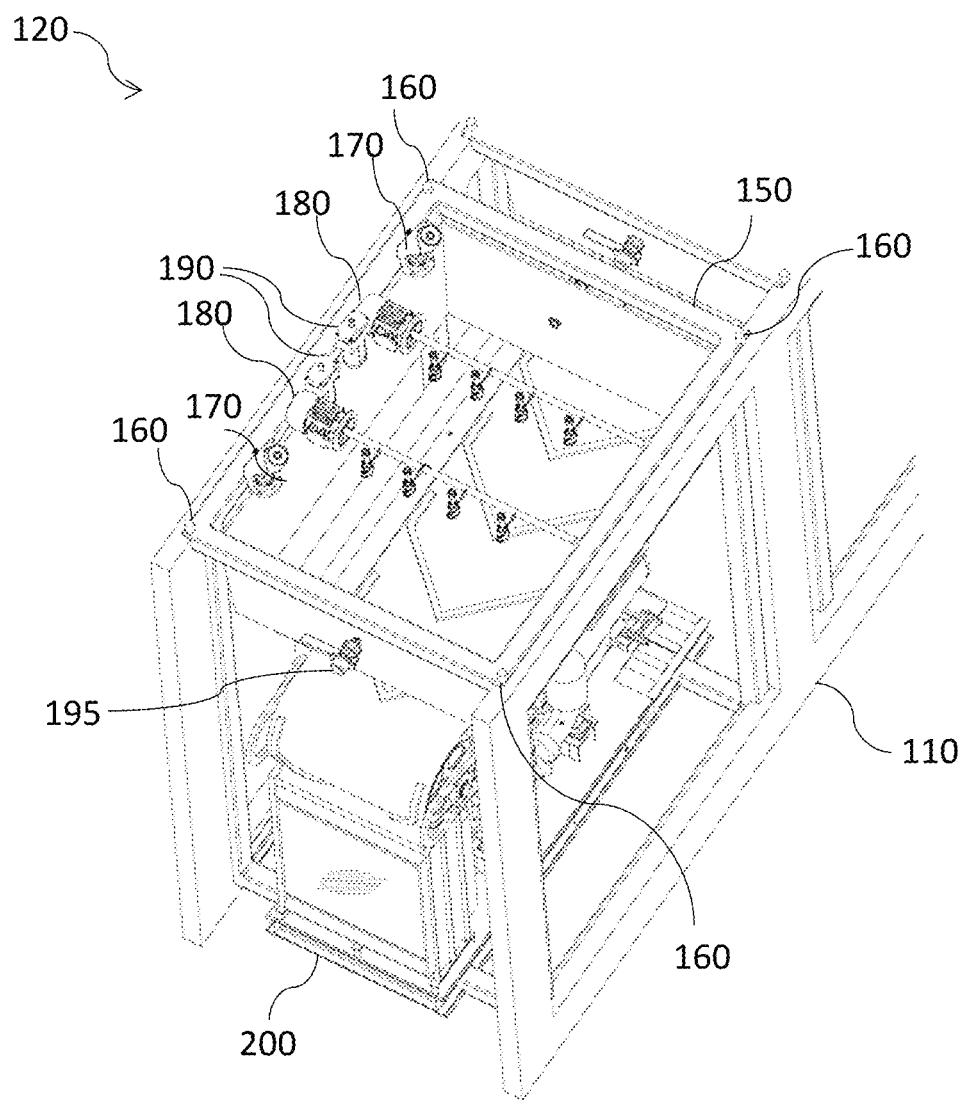
FIG. 2 is a top and side perspective view of the main unit of the conveyor system, according to an exemplary embodiment of the present invention.

Referring to FIG. 2 which shows the upper and side perspective view of the main unit 120. Each unit has a platform 150 mounted at the top of the frame 110 and may be used for mounting the transport container. Each platform 150 has a container mounting pin and load cell 160 at its corners for engaging the transport container. FIG. 2 shows four container mounting pins and load cells 160 at four corners of platform 150. For guided docking of the transport container on each unit of the system, each unit may further include one or more cameras with onboard lighting 170, rod motors 180, and hopper motors 190.

The camera with onboard lighting 170 includes built-in lighting features, such as LED lights, to provide illumination for photography or videography. This is particularly useful in low-light conditions. Also, lighting may enhance the visibility of objects without needing external light sources. Onboard lighting can help achieve better image quality by reducing shadows and providing consistent lighting, making it ideal for various applications.

For each container, the mounting pin load cell 160 may measure the weight of a shipping container accurately at each corner. Once installed and calibrated, the load cells may measure the weight applied at each corner. The data can be collected in real-time and displayed on a digital readout or transmitted to a computer for logging.

Each unit may also include an air shooter 195. The Straight Shooter's design may allow powerful air pulses to extend in a tight column directly into the bottom of the railcar gate of the transport container described in U.S. patent Ser. No. 11/174,098 B2. The "fire hose" effect of the air pulse may make these mini-blasters perfect for wet proppant pieces of material build-up.

The Hopper motor 190 may operate the rail car gate of a transport container, described in U.S. patent Ser. No. 11/174, 098 B2, controlling the flow of material and operating in conjunction with the rod motor 180 operating straight shooter positioning.

The main unit 120 may include motor 200 for driving the conveyor belts, for example, a dual-use hydraulic motor. The dual-use hydraulic motor 200 can drive the upper conveyor belt 130 and the lower conveyor belt 140. The upper conveyor belt may remain horizontal while the lower conveyor belt can be extended out and angled for adjustable stinger heights for loading the blender through the blender hopper or directly into the blender eliminating conventional augers. Similarly, the cuttings can be transported into the dryer. This makes the process simpler with less processing and dependence on on-site controllers.

Figure 3:
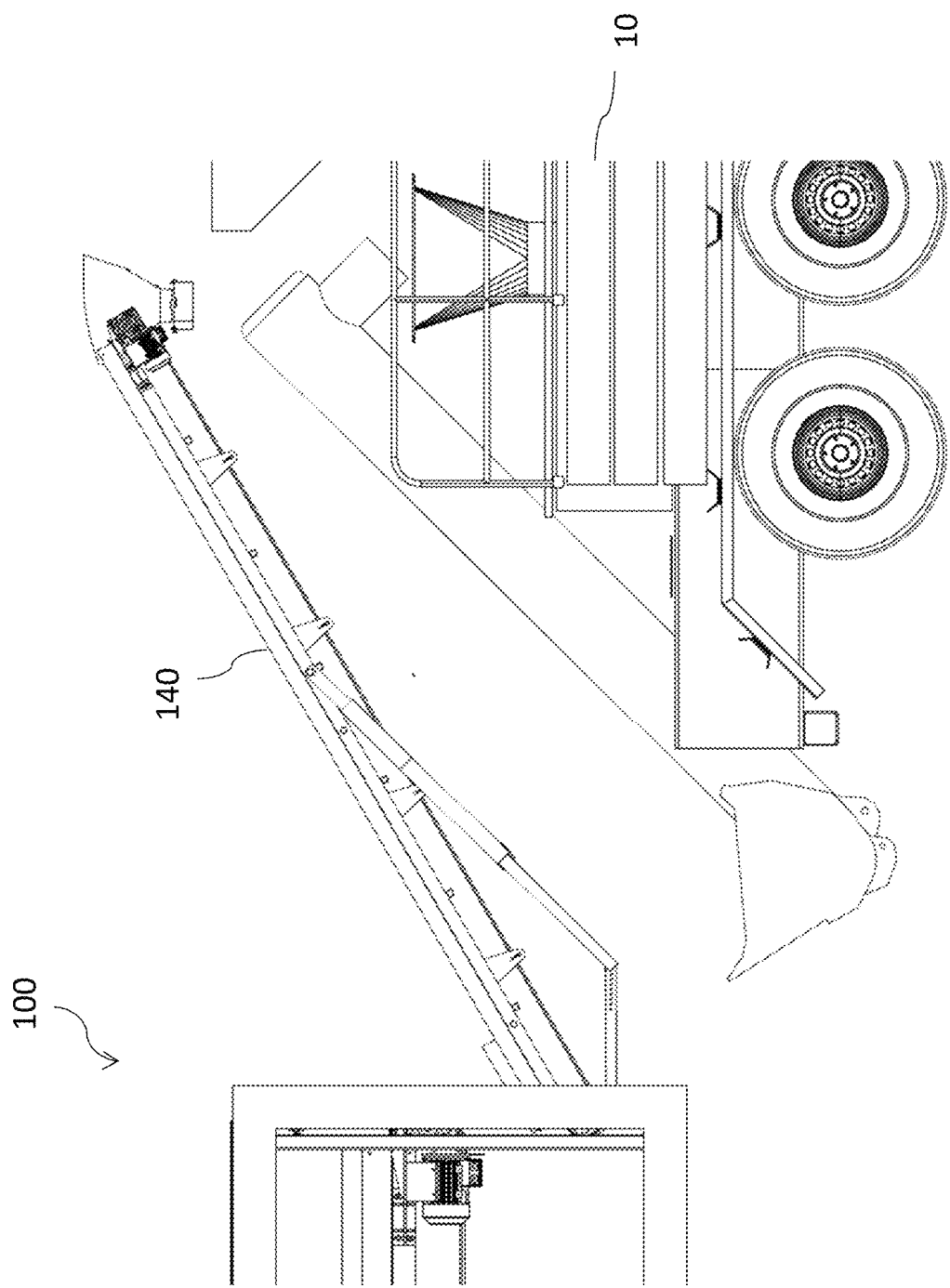
FIG. 3 shows the conveyor system in which the lower conveyor belt is shown in an extended state relative to a blender, according to an exemplary embodiment of the present invention.
Figure 4:
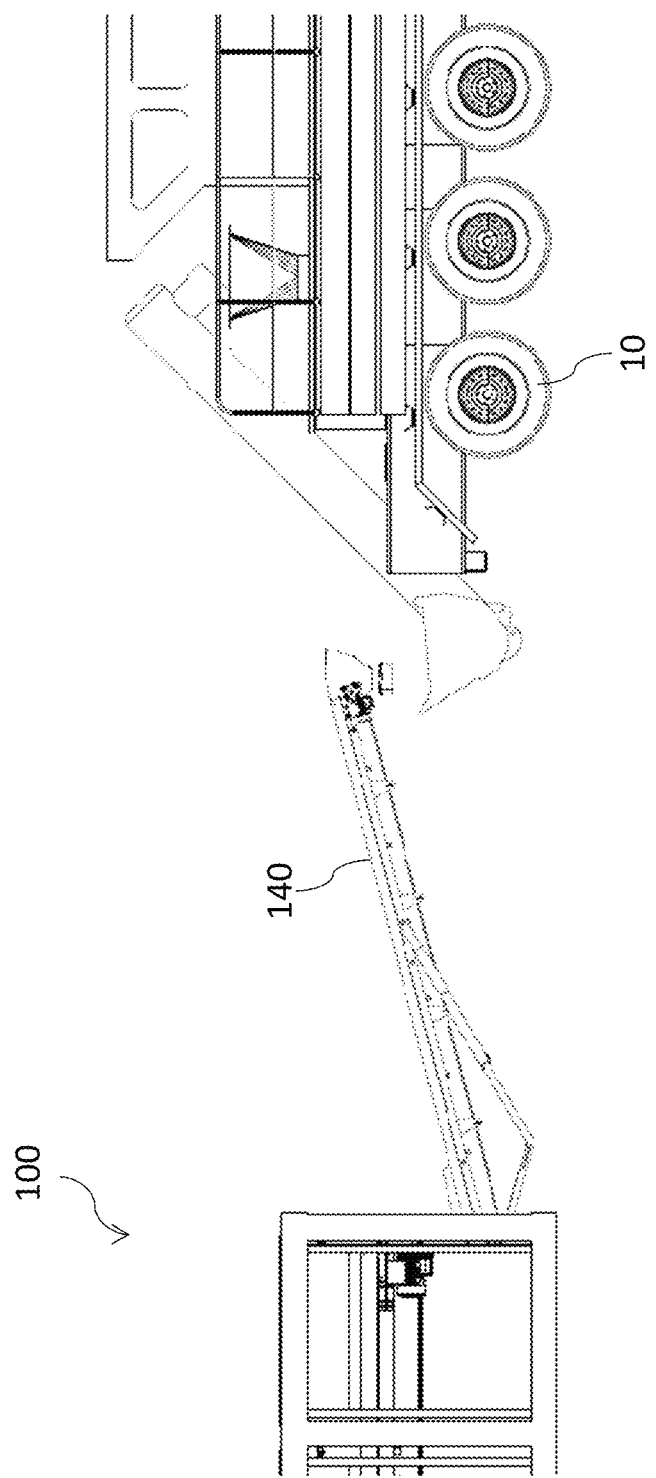
FIG. 4 shows the conveyor system in which the lower conveyor belt is raised at a lower height, according to an exemplary embodiment of the present invention.
Figure 5:
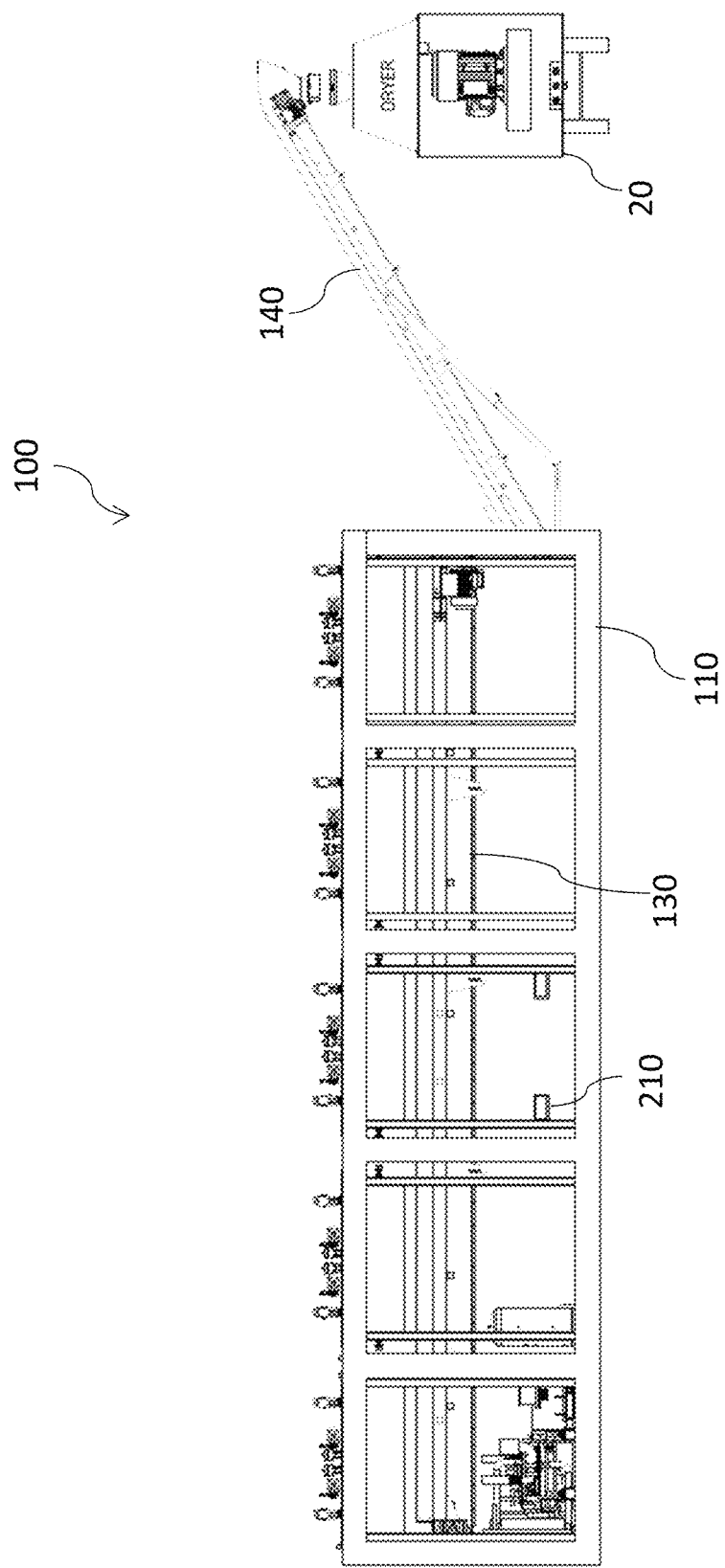
FIG. 5 shows the conveyor system and a dryer, according to an exemplary embodiment of the present invention.

FIG. 3 shows the lower conveyor belt 140 extended out and raised at an angle to directly feed a blender 10. FIG. 4 shows the lower conveyor belt 140 raised at a lesser height for feeding the hopper of the blender 10. FIG. 5 shows the feeding of the dryer 20. This versatility of the conveyor system allows it to easily adapt to different operational conditions. The upper conveyor belt 130 may be flat with a smooth surface that is used to transport items and materials horizontally. The lower conveyor belt 140 may be cleated and has raised section nubs that help lift the material. This prevents the material from slipping or rolling down from the slope. A forklift pouch 210 is also shown that may be used for loading and offloading from flatbed trailer.

The lower conveyor belt 140 can be angularly raised to different heights for moving materials up steep inclines or for applications where material needs to be kept in place on the belt. The speed of the lower conveyor belt 140 can be controlled independently of the upper conveyor belt 130. Thus, the upper conveyor belt 130 and the lower conveyor belt 140 can be driven at different speeds to carry the material. Similarly, the spray bars on both conveyors can be controlled separately.

Figure 6:
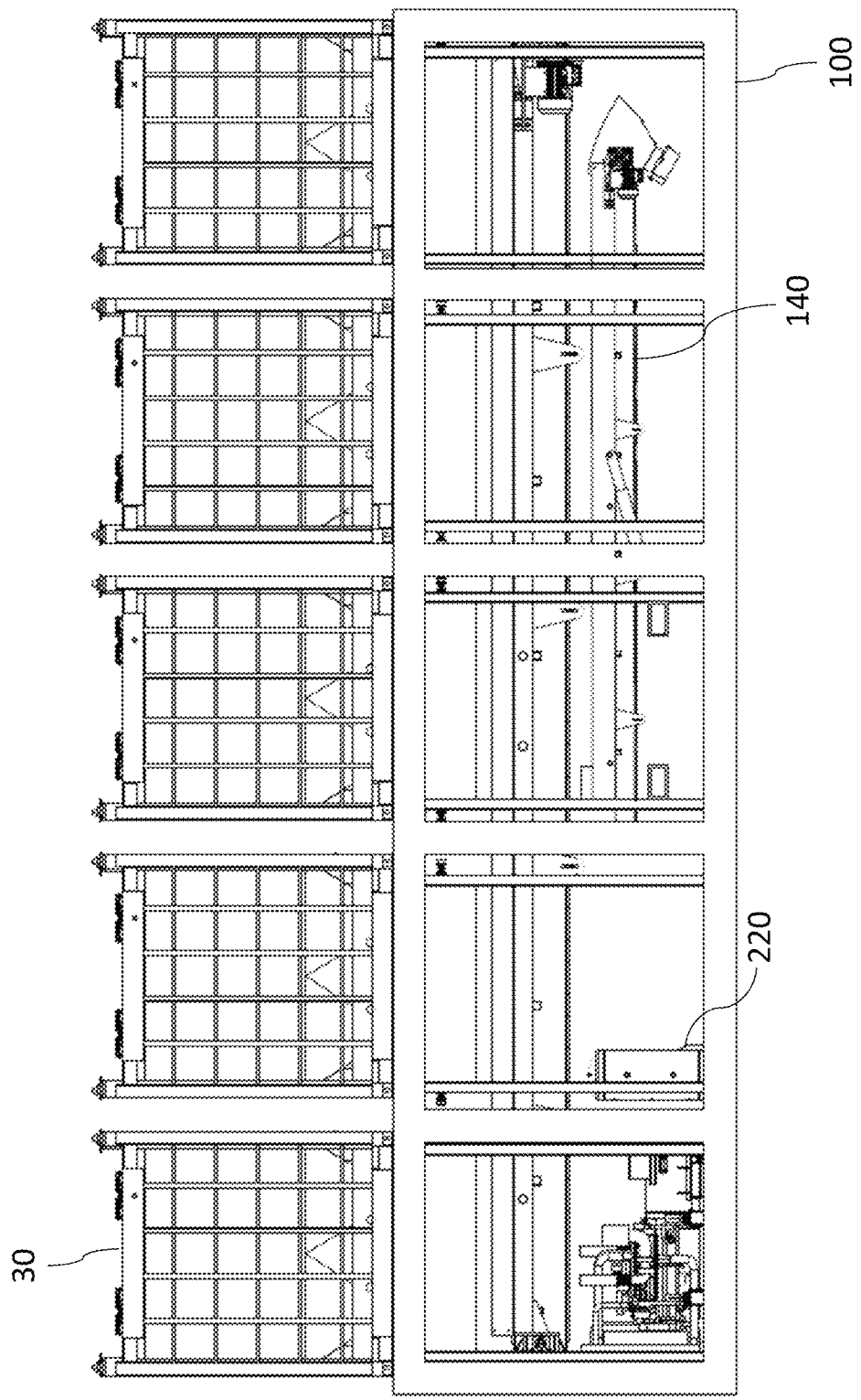
FIG. 6 shows five transport containers mounted on the five platforms of the conveyor system, according to an exemplary embodiment of the present invention.
Figure 7:
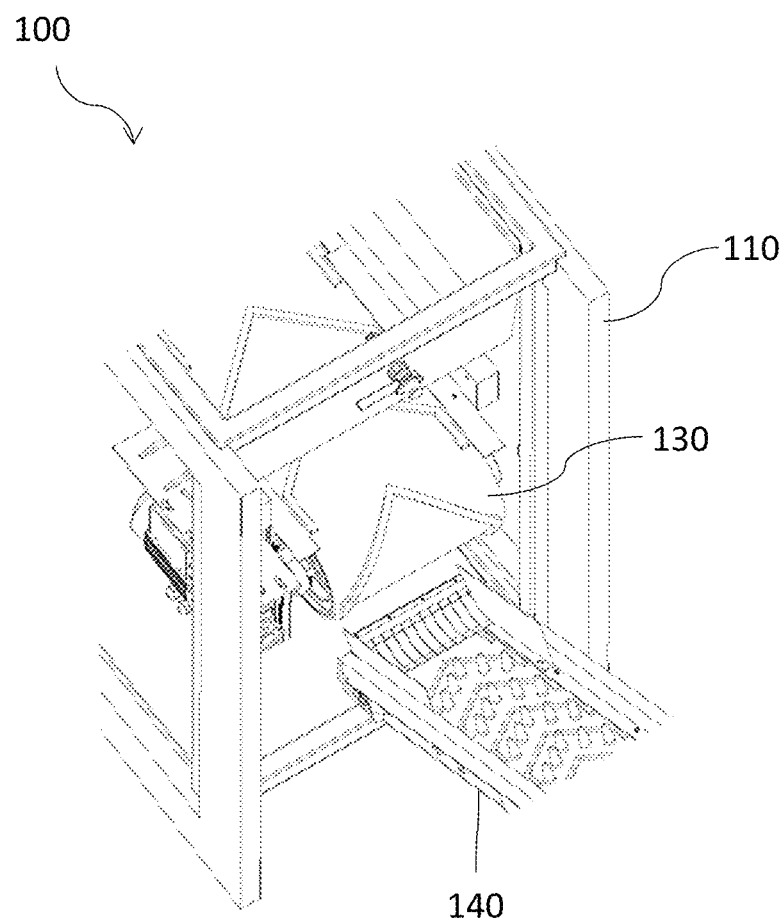
FIG. 7 shows the arrangement between the upper conveyor belt and the lower conveyor belt in operation mode, according to an exemplary embodiment of the present invention.

Referring to FIG. 6, shows five containers 30 mounted to the five units of the conveyor system 100. Each container can be mounted to each platform of the system. FIG. 6 also shows an air tank 220. Materials from the transport containers 30 may be dropped from transport container 30 to the upper conveyor belt 130 through suitable hoppers. The materials from the upper conveyor belt 130 can be dropped to the lower conveyor belt 140. Referring to FIG. 7, which shows the arrangement of the upper conveyor belt 130 and the extended lower conveyor belt 140. Materials from the transport container may be dropped onto the upper conveyor belt 130, which can be carried, which can be carried by the upper conveyor belt 130 and dropped onto the lower conveyor belt 140, and then further carried by the lower conveyor belt. The angular height of the lower conveyor belt 140 may be adjusted as and when required. Also, the upper conveyor belt is at some height from the lower conveyor belt which has the advantage of breaking any lumps in the material when the material drops on the lower conveyor belt.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A conveyor system comprises:
   an upper conveyor belt aligned horizontally and encased within a frame, wherein the frame is multi-unit, each unit comprises a platform on a top of the unit, and the platform is configured to mount a transport container, wherein each unit comprises four container mounting pins and load cells at four corners of the platform; and
   a lower conveyor belt is positioned below the upper conveyor belt, wherein the lower conveyor belt is configured to extend outwards from the frame and angularly lifted, such that material from the upper conveyor belt drops on the lower conveyor belt, wherein the upper conveyor belt and the lower conveyor belt are configured to be driven at different speeds.

2. The conveyor system of claim 1, wherein the lower conveyor belt is configured to be raised at different heights.

3. The conveyor system of claim 1, wherein the horizontal belt has a smooth and flat surface and is configured to transport materials horizontally.

4. The conveyor system of claim 3, wherein the lower conveyor belt is a cleated belt, wherein the lower conveyor belt is configured to transport material at an incline.

5. The conveyor system of claim 4, wherein the lower conveyor belt comprises raised section nubs configured to prevent materials from sliding or rolling off the lower conveyor belt during transportation.

6. The conveyor system of claim 1, wherein each unit further comprises one or more cameras with onboard lighting, one or more rod motors, one or more hopper motors, and one or more air shooters.

7. A method for conveying materials to a blender and a dryer in oil and gas fields, the method comprising:
   mounting one or more transport containers to one or more units of a conveyor system, wherein the conveyor system comprises:
      a frame, wherein the frame is multi-unit, each unit comprises a platform on a top of the unit, and the platform is configured to mount a transport container, wherein each unit comprises four container mounting pins and load cells at four corners of the platform;
      an upper conveyor belt aligned horizontally and encased within the frame, wherein the horizontal belt has a smooth and flat surface and is configured to transport materials horizontally; and
      a lower conveyor belt is positioned below the upper conveyor belt, wherein the lower conveyor belt is configured to extend outwards from the frame and angularly lifted, such that material from the upper conveyor belt drops on the lower conveyor belt, wherein the lower conveyor belt is a cleated belt, wherein the lower conveyor belt is configured to transport material at an incline;
   extending the lower conveyor belt outwards; and
   angularly raising the upper conveyor belt to a level of a hopper of the blender or the dryer.

8. The method of claim 7, wherein the lower conveyor belt is configured to be raised at different heights.

9. The method of claim 7, wherein the upper conveyor belt and the lower conveyor belt are configured to be driven at different speeds.

10. The method of claim 7, wherein the lower conveyor belt comprises raised section nubs configured to prevent materials from sliding or rolling off the lower conveyor belt during transportation.

11. The method of claim 7, wherein each unit comprises one or more cameras with onboard lighting, one or more rod motors, one or more hopper motors, and one or more air shooters.

\* \* \* \* \*